United States Patent [19]

Paul et al.

[11] Patent Number: 4,711,669

[45] Date of Patent: Dec. 8, 1987

[54] METHOD OF MANUFACTURING A BONDED PARTICULATE ARTICLE BY REACTING A HYDROLYZED AMYLACEOUS PRODUCT AND A HETEROCYCLIC COMPOUND

[75] Inventors: Albert P. Paul, Teaneck, N.J.; Richard A. Szarz, Medinah, Ill.; Roger J. Card, Stamford, Conn.

[73] Assignee: American Cyanamid Company, Stamford, Conn.

[21] Appl. No.: 795,068

[22] Filed: Nov. 5, 1985

[51] Int. Cl.$^4$ .......................... B28B 7/28; C08L 1/00
[52] U.S. Cl. ................................ 106/38.51; 106/204; 106/214; 164/521
[58] Field of Search ............ 106/162, 214, 204, 38.51; 164/521

[56] References Cited

U.S. PATENT DOCUMENTS

| | | | |
|---|---|---|---|
| 2,661,312 | 12/1953 | Richardson | 117/139.4 |
| 2,764,573 | 9/1956 | Reibnitz et al. | 260/67.5 |
| 4,013,629 | 3/1977 | Cummisford et al. | 260/123.7 |
| 4,089,691 | 5/1978 | Cummisford et al. | 106/38.4 |
| 4,098,615 | 7/1978 | Cummisford et al. | 106/162 |
| 4,098,859 | 7/1978 | Cummisford et al. | 264/122 |
| 4,158,574 | 6/1979 | Cummisford et al. | 127/32 |
| 4,400,480 | 8/1983 | Silano et al. | 106/213 |
| 4,482,654 | 11/1984 | Nishikawa et al. | 523/145 |

OTHER PUBLICATIONS

Chem. Abs. 96:108797m, (1982): Nishikawa et al.
Chem. Abs. 98:7323q, (1983): Daicel Chemical Industries, Ltd.
Chem. Abs. 102:99473r, (1985): Shinto Kogyo K.K.

*Primary Examiner*—Theodore Morris
*Attorney, Agent, or Firm*—Frederick R. Cantor; Henry Jeanette; Michael J. Kelly

[57] ABSTRACT

Disclosed herein is a method of manufacturing a bonded particulate article by admixing particulate material with a binder system, the binder system being formed by admixing a polyol comprising a water soluble amylaceous hydrolyzate with a heterocyclic compound comprising the reaction product of glyoxal, urea, and formaldehyde, alone, or in further combination with ethylene glycol, with a solvent, and with an acid effective to control the rate of cross-linking between said polyol and said heterocyclic compound; forming the admixture in a shape and curing the shape to a bonded article.

25 Claims, No Drawings

METHOD OF MANUFACTURING A BONDED PARTICULATE ARTICLE BY REACTING A HYDROLYZED AMYLACEOUS PRODUCT AND A HETEROCYCLIC COMPOUND

CROSS-REFERENCE TO RELATED APPLICATION

This application is related to the concurrently filed application of Albert Peter Paul and Roger John Card, Ser. No. 795,067.

FIELD OF THE INVENTION

This invention relates to a method of manufacturing a bonded particulate article by admixing a curable binder with particulate material. More particularly, this invention relates to composition of a particulate material such as sand or cellulose fiber, with a binder system formed from a polyol comprising a hydrolyzed, gelatinized, amylaceous product, a reaction product of glyoxal, urea and formaldehyde, alone, or in further combination with ethylene glycol, a solvent, and an acid catalyst in an amount sufficient to allow the crosslinking reaction between the compounds to proceed. Articles produced by the procedure have utility as foundry cores and molds and in the production of pressed fiber board.

BACKGROUND OF THE INVENTION

It has long been the practice in both the textile and paper industries to apply starch solutions to the fibers for various purposes. The ultimate properties of such products have been improved by crosslinking the starch with polyfunctional compounds, such as glyoxal, and the like. With the advent of heat-hardenable resins such as urea and melamine resins, it became desirable to mix such resins with the starch to obtain an even more durable finish. Ultimately, heterocyclic reaction products of (i) alpha,beta dicarbonyl compounds, (ii) urea, thiourea or guanidine and (iii) an aldehyde, e.g., formaldehyde, assumed an important position in the art of textile finishing. In Richardson, U.S. Pat. No. 2,661,312, for example, a stable, curable finish for textiles comprises 1,3-bis-(hydroxymethyl)-2-imidazoline, starch and tartaric acid. The heterocyclic compound is made, for example, by reacting ethyleneurea with formaldehyde and has two nitrogen-bonded methylol groups which are capable of cross-linking the starch, when heated, the rate of cross-linking being promoted by the presence of tartaric acid. Important state-of-the-art textile finishes also have evolved from such technology. In v. Reibnitz, U.S. Pat. No. 2,764,573, condensation products of glyoxal and ureas, thioureas or guanidines (glyoxal monoureins) are modified by reaction with aldehydes, e.g., formaldehyde, or aldehydes and an alcohol, and there are produced the corresponding N-substituted alkylol or alkoxyalkyl substitutents. The resins are shown to cure, especially after the addition of acid hardening catalysts, to waterproof and elastic films. It has subsequently been discovered and is known in the art that the glyoxal monourein and aldehyde condensation products are of great importance when used to treat textiles. In Gagliardi et al, U.S. Pat. No. 3,209,010, it is disclosed that such materials, especially when further substituted on the 4- and 5-positions by ether, ester, carbamoyl groups, and the like, provide chlorine-resistant finishes on textiles.

The crosslinking of polyhydroxyl compounds, particularly polysaccharides like starch, with multifunctional reagents reactive with hydroxyl groups is known outside of the textile field, such as in the manufacture of paper board from wood and other fibers and foundry molds from sand.

Foundry cores and molds present unique problems. These are used in making metal castings and are normally prepared from a composition including sand or other refractory material and a curable or polymerizable binder coated on the refractory particles. The purpose of this binder coating is to permit the mixture to be hardened after it is first shaped or molded into a desired form. Shaping of the composition, which usually comprises a major amount of sand and a minor amount of binder, is accomplished through ramming, blowing, or otherwise introducing the mixture into a pattern or core box to thereby assume the shape defined by the adjacent surfaces of the pattern. Then, by using a catalyst or polymerization accelerator introduced before or after the sand mix has been introduced into the pattern, and-/or by using heat, the binder is caused to cure, thereby converting the shaped foundry mix into a hard, solid foundry core. This curing is usually accomplished either in the original core box, in a gassing chamber, or in a holding pattern. Commonly used binders include such materials as phenolic resins, urea-formaldehyde resins, furfural alcohol modified urea-formaldehye resins, furan resins, drying oils and urethane oils.

Generally speaking, two basic techniques exist in the art for effecting a cure once the sand-binder mixture is shaped. The first of these techniques, the elevated temperature method, involves the use of heat-curable resin system wherein heat is used to effect hardening of the binder. The second technique is known in the art as the "no bake" or "cold-setting" process. As its name implies, the latter process is carried out at room temperature or slightly above, i.e., 5°–50° C. and more often between 15°–35° C.

Each of these systems has its own set of limitations which are well known to those active in the field. Some materials are very energy intensive; some pose significant handling and environmental problems; some have limited utility because gas evolutign from the binder during metal pouring creates surface defects in the finished metal article; and, if the cores are to be baked, green strength additives must be used so that the cores have sufficient strength to be put into and through an oven.

In Cummisford et al., U.S. Pat. Nos. 4,013,629; 4,089,691; 4,098,615; and 4,098,859, are disclosed the use of the catalyzed glyoxal saccharide system in foundry sand cores, cellulose press formed prodocts, adhesives, coating binders and in many other areas. In Cummisford et al., U.S. Pat. No. 4,158,574 a water soluble hydrolyzed gelatinized amylaceous material is disclosed to be superior to native, conventional cereals as the polyol component in an acidic glyoxal binder system. The developments in these patents overcome many problems by controlling the amounts of reactants and catalyst and by selecting the saccharide from the wide range of materials available. In practice, however, the ultimate products are somewhat deficient in hydrolytic stability, which limits the use of these binder systems to foundries in which the temperature and humidity can be controlled.

Further representative of the state of the art are Nishikawa et al, U.S. Pat. No. 4,482,654 who coat foundry sand grains with a binder comprised of methylolmelamine or alkylated methylolmelamine and a water soluble polyol, e.g., hydroxymethyl cellulose. Sand molds having a water soluble binder containing sucrose, urea, methylolmelamine or alkylated derivatives and an acidic crosslinking catalyst are disclosed in Japanese Patent Publication No. 59,185,542, Oct. 22, 1984, Chem. Abs. Vol 102:99473r (1985); binders for molding sand consisting of methylolmelamine precondensed with a saccharide are disclosed in French Patent Publication, Apr. 11, 1980 Chem. Abs. Vol 96:108797m (1982); and glucose mixed with methylated methylolmelamine and used as a binder for foundry sand is described in Japanese Patent Publication No. 57,124,542, Aug. 3, 1982; Chem. Abs. Vol. 98:7323q (1983). All such systems show mainly hydrolytic stability problems common to the starch-glyoxal system mentioned above and there still exists the need for improved binder resins.

It has now been discovered, and is the subject of this invention, that binders prepared from hydrolyzed, gelatinized amylaceous materials and the condensation products of glyoxal, formaldehyde, urea, and, optionally, ethylene glycol, have remarkably beneficial properties, especially resistance to deterioration by ambient moisture. It is important, especially when using such binders with nonalkaline sands, to include an acid crosslinking catalyst in the composition.

SUMMARY OF THE INVENTION

According to the present invention there is provided a curable composition adapted to produce a shaped bonded particulate article, said composition comprising (i) a particulate material; and, as a binder therefore, (ii) a polyol comprising a hydrolyzed, gelatinized amylaceous material;

(iii) a crosslinker for said polyol (ii) comprising the reaction product of glyoxal, urea and formaldehyde, alone, or in further combination with ethylene glycol; and (iv) an acid catalyst; and (v) a solvent for the binder.

Also contemplated is a method of manufacturing a bonded particulate article comprising the steps of (i) admixing particulate material with a binder system, the binder system being formed by admixing a polyol comprising a hydrolyzed, gelatinized amylaceous material, a crosslinker for said polyol (ii) comprising the reaction product of glyoxal, urea and formaldehyde, alone, or in further combination with ethylene glycol, a solvent, and an acid;

(ii) forming the admixture into a shape; and (iii) curing to produce the bonded article.

In preferred features, the crosslinker will be of the formulae:

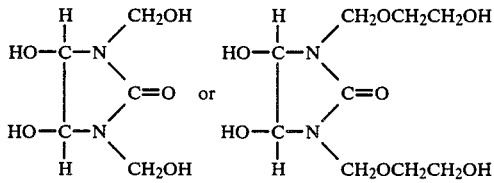

or a mixture of the foregoing compounds.

Also contemplated is a cold-cast procedure comprising the steps of (i) admixing a particulate material with a binder system wherein the latter is formed by admixing a hydrolyzed, gelatinized amylaceous material with a crosslinker as defined above, a solvent and an acid;

(ii) forming the article in a mold;

(iii) removing the article from the mold; and (iv) desolventizing the article.

In a preferred feature the present invention contemplates a method of manufacturing a foundry core comprising mixing sand and a heat-accelerated curable binder system wherein the binder system is produced by the following steps, the percentages being based on the weight of the sand:

(a) crosslinking 1–3% of hydrolyzed, gelatinized amylaceous material with 0.1–3% of a crosslinker defined by the above formulae in about 50% aqueous solution; and (b) controlling the rate of reaction by the use of 0.01–1.0% of an acid as a catalyst, said mixture also comprising 0–10% clay, 0–10% silica flour, 0–10% iron oxide, and 0–2% of a mold release material selected from the group comprising paraffins, other wax, wax emulsion, asphalt emulsion, and wax-asphalt emulsion.

DETAILED DESCRIPTION OF THE INVENTION

The saccharide-containing material, used as a polyol in this invention is a hydrolyzed-gelatinized amylaceous material. This material which is disclosed and claimed in the above-mentioned Cummisford Patent, U.S. Pat. No. 4,158,574, has alkaline viscosities which are in the range of 10 to 20 seconds using a 1.3 g sample and 15 to 100 seconds using a 5.2 g sample and having cold water solubles of between 50% and 98%. The alkaline viscosity (AV) is an approximate, but useful, measure of molecular weight. It can be obtained by dispersing the sample 1.3 or 5.2 g. in 50 ml of 1N KOH. A micro bowl Waring Blendor is suitable for preparing the dispersions. The dispersion is allowed to stand 1 minute for de-airation and a 10 cc. aliquot is pipetted into a #200 Cannon Fenske viscometer immersed in a 40° C. water bath. The sample is moved into the ready position in the viscometer and held there for a time sufficient to assure temperature equilibrium of the sample and bath. A total elapsed time of 12 minutes is used, including the one minute of mixing and the 1 minute of de-airation. The time of the sample to flow between the measured marks on the viscometer is read and recorded as the Alkaline Viscosity at 1.3 or 5.2 g. Cold water solubles (CSW) are determined by a test to be described later.

The amylaceous material is produced by: acid hydrolysis at moistures between 5% and 12%, as is basis, using between 0.1% and 2% acid anhydrous basis; neutralization of the acid hydrolyzed amylaceous material to between pH 3 and 6 obtained on a 10% solids water slurry; gelatinization of the neutralized acid hydrolyzed amylaceous material at moisture levels between 15% and 40% and at temperatures of between 212° and 400° F.; removal of water from the gelatinized product by allowing residual heat to flash off water and by subjecting it to the action of a drying medium such as air or heat; and/or commuting the amylaceous mass to pellets or flakes; and comminuting the dried amylaceous mass to a flour. Further details are provided by the said patent, and a working procedure is included hereinafter.

The hydrolyzed amylaceous material can be used alone, or in further combination with up to 50% by weight of a conventional polyol. Such polyols are those which react rapidly with glyoxal monourein-aldehyde condensates and are typically saccharides, such as sugars, starch, starch hydrolyzates, gums, dextrins, and the like, so long as these are water-hydratable or soluble and have available reactive groups for cross-linking. Proteins, especially glyco proteins, also can be used, again with the restriction that these are reactive with glyoxal monourein-aldehyde condensates, and, illustratively, these will include collagen protein, and the like. Illustratively, the additional saccharide-containing material to be used with the hydrolyzed gelatinized amylaceous material can be selected from sucrose, maltose, corn syrup, corn syrup solids, glycoproteins or mixtures of any of the foregoing.

The crosslinking components used in the present invention are reaction products of glyoxal, formaldehyde, urea, alone, or in further combination with ethylene glycol. They are made, in general, by reacting aqueous solutions of glyoxal and of formaldehyde with urea at a pH near neutral or slightly on the acid side, e.g., 5 to 7.5, and at a suitable temperature, e.g., 40°-70° C. The mole ratio of reactants generally is one glyoxal: two formaldehyde:one of urea and, if used, : two of ethylene glycol. The progress of the reaction can be followed by a number of methods, but it is convenient to measure reduction in free formaldehyde content—when this falls below about 1%, the reaction is deemed complete. Usually a few hours, e.g., 2-3 hours, is sufficient. Generally a small amount of acid, e.g., citric acid or hydrochloric acid, or base, e.g., NaOH, is added at the end of the reaction to adjust the pH to about 3-5. The product is obtained as an aqueous solution, which can be adjusted to a solids content in a convenient range, e.g., 40-50%, for used in the present invention. The crosslinkers are compounds of the formulae:

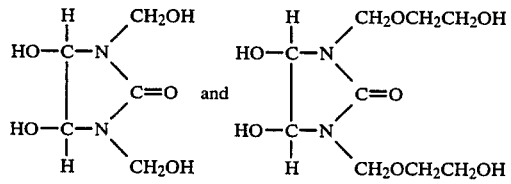

Mixtures of the compounds can be used without departing from the scope of the invention. Also, compositions comprising the dimethylol compound and ethylene glycol in water and optionally partially neutralized citric acid are suitable.

The preparation of such compounds is accomplished by means known to those skilled in this art. Suitable procedures are set forth hereinafter.

The catalyst or accelerator employed is an acidic type catalyst and may be a free inorganic or organic acid, acid salt, alkanolamine salt and the like of the type well known to those in the art. See, for example, Beachem, U.S. Pat. No. 3,304,312. The concentration of catalyst employed can range from about 0.1 to about 25% or higher, based on the weight of the solids in the binder, depending on the particular catalyst type employed. Thus, for example, from between about 0.1% and about 10% of a free acid such as sulfuric, hydrochloric, acetic, phosphoric, tartaric, oxalic or the like may be used, while in the case of ammonium chloride amounts of from between 0.5 and 10% can be used. In the case of amine salts, such as alkanolamine salts, e.g., diethanolamine hydrochloride from about 1 to about,10% are most useful, while with respect to salts such as magnesium chloride amounts of between about 0.5 and 25% have been successfully employed. In addition to magnesium chloride, zinc nitrate, aluminum chloride and other known conventional metal salts are normally employed in amounts which can correspond to between 0.5 and 25% based on the weight of the solids in the binder composition. Preferred for the invention are Lewis acid salts. These denote a family of metal salts which are electron pair acceptors. They comprise halides, nitrates, sulfates, mixed halides/hydroxides, and the like, of metals such as iron, tin, phosphorus, arsenic, antimony, bismuth, zinc, aluminum, magnesium, boron and the like. Typical examples of Lewis acid salts are $FeCl_3$, $SnCl_4$, $PF_5$, $AsF_5$, $SbF_5$ and $BiCl_3$, as well as $Zn(NO_3)_2$, $MgCl_2$, $Mg(NO_3)_2$, $Al_2(SO_4)_3$, $AlCl_x(OH)_y$, $x+y=3$, mixtures thereof, and the like. Preferred Lewis acid salt catalysts for use herein are zinc nitrate and magnesium nitrate.

In the production of foundry cores, there are a number of different methods for applying heat to the formed cores to bring about a cure of the binder. These include cold forming followed by baking of the cores, forming the cores in heated patterns, sometimes called a hot box, and forming the cores in a pattern or box followed by forcing heated air through the core.

This invention can be used in any of the above methods. The advantages of this invention are (i) the use of aqueous solvents which emit no odors or noxious fumes (ii) that the binder system presents no air or water pollution hazards, and, especially, (iii) the hydrolytic stability of the bonded article is very high.

A bonded particulate article manufactured by the method of the present invention may preferably comprise 80%-99% particulate matter and 1%-20% binder system, with the latter being comprised of 20%-55% saccharide material, 3%-60% of crosslinker, 0.2-10% of an acid and 15-85% of solvent, by weight. If water is the solvent, part of the content can be contributed by moisture in the sand. Part also can be contributed by any solvent in which the crosslinker is contained.

A preferred method of manufacturing a foundry core under the present invention comprises the steps of mixing sand and a heat-accelerated curable binder system wherein the binder system is produced by the following steps, weight percentages being based on 100 parts of sand: crosslinking 1-3% of hydrolyzed, gelatinized matter with 0.1-3% of a crosslinker as above defined in a 25-90% aqueous solution, controlling the reaction by the use of 0.01%-1% acid as a catalyst using 0%-10% clay, 0%-10% wood flour, 0%-10% silica flour, 0%-10% iron oxide (as optional fillers), and 0%-3% of a material selected from the group comprising wax, wax emulsion, asphalt emulsion or wax-asphalt emusion (as optional flow promoters and/or mold releases); and forming the mixture to desired shape and causing it to cure to a hardened state. Preferred compositions for some processes include a release agent. This can comprise a mixture of a paraffin solvent alone or including a fatty acid. A useful such composition is a mixture of kerosene and oleic acid in a weight ratio of from about 8:1 to about 1:1. The amount used can vary but preferably is from 0.05 to 2% based on the sand, by weight.

In manufacturing a resinlike material with the present invention the method may include mixing a filler material and a heat-accelerated curable binder system, the binder system having been produced by cross-linking a hydrolyzed, gelatinized amylaceous substance with a heterocyclic crosslinker as defined above in the presence of an amount of an acid effective to maintain the reaction at a suitable, rate during curing. The method of mixing can vary, but generally will include the following steps: (i) dissolving or dispersing the acid, hydrolyzed, gelatinized amylaceous substance and heterocyclic compound in water; and (ii) causing the mixture to react by the application of heat. In one preferred way of operating, prior to application of heat, up to 80% of the weight of the binder system of fillers, pigments and extenders are dispersed in the system. Even more preferred, is to premix up to 80% of the weight of the binder system of fillers, pigments and extenders with the amylaceous material, then to add the cross linker and the acid in admixture.

Curing of the core will be at conventional operating conditions, e.g., 5–180 seconds in a hot box, operated at between 250°–550° F. The core usually will be removed from the form and dried in an oven. Conventional techniques can be used. The core can be post-cured with microwave energy.

If the binder system is used with other fillers to make other shaped articles, practices entirely conventional in those arts will be used. Merely by way of illustration, the crosslinker and the acid can be slurried in warm water with wood fibers. Then hydrolyzed, gelatinized corn flour can be added and blended. Dewatering on a vacuum filter gives a damp preform which can be pressed and cured at 230° F. for 20 minutes to produce a pressed fiberboard with a hard, glossy surface.

The following procedures are used to prepare materials used in the working examples.

PROCEDURE A

A hydrolyzed, gelatinized amylaceous starch is made by the procedure of Example 25 of U.S. Pat. No. 4,158,574.

Eight 500 gm samples of yellow corn flour are blended with 0.2 to 0.4% $H_2SO_4$ and tempered to 18–24% moisture. After addition of acid and water, the samples are blended for 20 minutes in a Hobart mixer at low speed. The samples are then processed in a laboratory extruder employing a 220° F. rear barrel temperature and 280° F. for the discharge end ⅓ length. The extruder is run at 50 rpm with a 2:1 compression screw. The extruded samples are cooled to room temperature and ground on a hammermill. The 10% slurry of the sample gives a pH of 3.5–4.1 The products are then tested for cold water solubles and alkaline viscosities.

A typical product has a cold water solubles (CWS) of 12.8%, an alkaline viscosity of 20.3 seconds (1.3 g. of sample). After extrusion it has a CWS of 84.3% and an alkaline viscosity of 13.6 seconds (1.3 g. sample).

The method for determining alkaline viscosities has been given above. The procedure for the cold water solubles (CWS) is as follows: A 20 g. sample is weighed and added to 480 g. of distilled water in a 600 ml. beaker. A magnetic stirrer is used to disperse the material with stirring carried out for 5 minutes. (If the sample tends to lump when added to the water, addition is made by sifting the sample into the water with stirrer running using a tea strainer.) The slurry is allowed to stand for one hour and then mixed again for 2 minutes. The slurry is filtered using 18.5 cm. fluted paper (Reeve Angel #802 or equivalent). The first few cc's of filtrate are discarded. Ten ml. of the filtrate are placed in a weighed aluminum weighing dish and the dish and aliquot weighed. The aliquot is dried at 70° C. in a circulating air oven for 24±2 hours. The dried residue is weighed and the % solubles calculated.

PROCEDURE B (RP-1)

A reaction product comprising glyoxal, urea and formaldehyde is prepared by the following procedure:

A mixture of one mole of glyoxal (as a 40% aqueous solution) and 2 moles of formaldehyde (as a 44% aqueous solution) is adusted to a pH of 6.4–6.5 with sodium bicarbonate. To this is added one mole of urea and the mixture is heated to 60° C. maintaining the pH at 6.4–6.5 by frequent additions of sodium bicarbonate. When the free formaldehyde content by analysis drops to 1% the reaction mixture is cooled, the pH adjusted to 3.0 with hydrochloric acid and water is added to adjust the solids content to 44–45%.

The compound has the formula

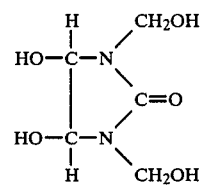

PROCEDURE C-1(RP-2)

A reaction product comprising glyoxal, urea, formaldehyde and ethylene glycol is prepared by the following procedure:

In a reaction vessel, one mole of glyoxal (40.3% glyoxal, 4.7% aqueous solution) is mixed with two moles of formaldehyde (50% formalin aqueous solution), one mole of urea and 1.5 moles of ethylene glycol. The pH of the mixture is adjusted by addition of NaOH to a value in the range of 6 to 7 and is maintained in that range while, the mixture is reacted at 60° C. for three hours. Then about 0.5% by weight of citric acid, based on the weight of the finished product, is added to the mixture and the pH is adjusted to 3.0 by the addition of $H_2SO_4$. The temperature of the mixture is maintained at 60° C. for one hour, then cooled to about 25° C. and the pH is finally adjusted to about 4.5 to 5.5 by the addition of NaOH to make the finished product solution (solids content about 40–50% by weight).

The compound has the formula

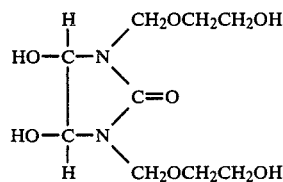

PROCEDURE C-2 (RP-2)

As an alternate to C-1, the following procedure is suitable:

In a reaction vessel, one mole of glyoxal (40.3% glyoxal, 4.7% formaldehyde aqueous solution) is mixed with two moles of formaldehyde (50% formalin aqueous solution), and one mole of urea. The pH of the mixture is adjusted by the addition of NaOH to a value in the range of 6 to 7 and is maintained at that range while the mixture is reacted at 60° C. for three hours. Then 1.5 moles of ethylene glycol is added. Then about 0.5% by weight of ctiric acid, based on the weight of the finished product, is added to the mixture and the pH is adjusted to 3.0 by addition of $H_2SO_4$. The temperature of the mixture is maintained at 60° C. for one hour, then cooled to about 25° C. and the pH is finally adjusted to about 4.5 to 5.5 by addition of NaOH to make the finished product solution (solids content about 40 to 50% by weight).

DESCRIPTION OF THE PREFERRED EMBODIMENTS

The following Examples illustrate the present invention, but are not intended to limit the claims.

The sand mixes in the examples are made in a Simpson Sand Muller. Silica sand and the polysaccharide of Procedure A are dry blended for 30 to 90 seconds. Water is added and the system blended for two minutes. An aqueous solution of the nitrogenous heterocyclic crosslinker of Procedures B or C and metal salt as specified is then added and the system is blended for two minutes. The Standard American Foundry Society 1-inch tensile briquets are then prepared by hand ramming into the tensile core boxes. The resulting 1" thick dog-bone shaped cores are baked at 350° F. for 30 minutes. Tensile strength is measured after 2 hours using a Detroit Testing Machine Company Model CST testing machine.

EXAMPLE 1

Based on 100 parts by weight of sand, 2% of amylaceous starch (cereal), 0.5% of the reaction product (RP-1) of glyoxal, urea and formaldehyde (Procedure B) and 0.03% of zinc nitrate and 2.5% of water are mixed, molded, cured and tested.

For comparison purposes, mixtures omitting the crosslinker and the Lewis acid salt, and omitting the Lewis acid salt, respectively, are prepared. The results are as follows:

| Example | % Cereal | % RP-1** | % Zn(NO$_3$)$_2$ | % H$_2$O | Tensile Strength (psi) |
|---|---|---|---|---|---|
| 1A* | 2 | 0.0 | 0.0 | 2.5 | 56 |
| 1B* | 2 | 0.5 | 0.0 | 2.5 | 63 |
| 1 | 2 | 0.5 | 0.03 | 2.5 | 280 |

*Control
**Based on solids, 44% in water.

The foregoing results demonstrate the advantageous results achieved by the three-component binder system of the present invention.

To further demonstrate the advance in the art provided by the present invention, hydrolytic stability tests were carried out. The test cores in the form of dog bone specimens prepared according to Example 1 were made and for comparison purposes specimens prepared according to Example 2 of U.S. Pat. No. 4,098,615, which employed glyoxal as a crosslinker were made. Tensile strengths were measured two hours after production and then exposure to 80% relative humidity at 80° F. for 16 hours. The formulations used and the results obtained are set forth as follows:

| Example | Cereal | % Cross linker | % Catalyst | % H$_2$O | Tensile Strength (psi) as made | 80% RH exposed |
|---|---|---|---|---|---|---|
| 1 | 2.0 | 0.5 RP-1 | 0.03 Zn(NO$_3$)$_2$ | 2.5 | 280 | 200 |
| 1C* | 2.0 | 0.6 Glyoxal | 0.5 NaCl | 2.8 | 274 | 50 |

The results show that the present invention provides bonded articles with substantial hydrolytic stability resistance which permits their use in environments, such as foundrys, with high ambient humidities.

EXAMPLES 2-3

The procedure of Example 1 is repeated. The amounts of RP-1, Zn(NO$_3$)$_2$ and H$_2$O are the same as used in Example 1 and the hydrolyzed cereal is partially replaced in stages with a conventional cereal. The following results are obtained:

| Example | % Cereal | % CC* | Tensile Strength (psi) |
|---|---|---|---|
| 2 | 1.88 | .12 | 195 |
| 3 | 1.5 | .5 | 103 |

*Acid modified corn starch (Krause Milling Co. "Amerikor" brand).

Substitution of conventional cereals for part of the hydrolysed cereal in Example 1 results in a lower core tensile strength. However Examples 2-3 demonstrate that a conventional cereal (CC) can successfully be added in place of some of the hydrolyzed amylaceous starch. Other conventional cereals which can be used include wheat flour, rye starch, and the like.

EXAMPLES 4-6

The procedure of Example 1 is repeated with the exception that the amount of RP-1 is increased.

| Example | % Cereal | % RP-1 | Tensile Strength (psi) |
|---|---|---|---|
| 4 | 2 | .60 | 335 |
| 5 | 2 | .65 | 367 |
| 6 | 2 | .75 | 420 |

It is seen that tensile strength increases with the level of RP-1.

EXAMPLE 7

A core is prepared as in the manner of Example 1 except it is prepared in a hot box and is post-cured in a microwave oven for 30 sec. The core tensile strength is 330 psi, demonstrating the beneficial effect of using a microwave oven.

EXAMPLE 8

A sand core is prepared as described in Example 1 except that magnesium nitrate is substituted for zinc nitrate and the reaction product from glyoxal, urea, formaldehyde and ethylene glycol (RP-2, Procedure C-1) is used in place of RP-1. The resulting tensile strength is 207 psi, demonstrating the beneficial effect of this system. If RP-2 made by the process of Procedure C-2 is used, substantially the same results will be obtained.

EXAMPLE 9

If the following composition is made: 16 g. of RP-1 and 4 g. of zinc nitrate in 600 ml. of warm water is formed into a slurry with 80 g. of wood fibers. Twenty g. of acid modified gelatinized corn flour (Procedure A) is then intimately blended into the fiber slurry to insolubilize the RP-1. Then if this mixture is dewatered on a vacuum filter there should be produced a preform which can be pressed and cured at about 230° F. for 20 minutes into a finished board having a hard, glossy surface.

The related application being concurrently filed in the name of different inventive entities discloses and claims compositions and methods using polyols broadly with crosslinker which are heterocyclic compounds containing cyclic carbon-bonded hydroxy groups and having at the same time at least two nitrogen-bonded methylol or hydroxyethoxy methyl groups, as well as others.

The foregoing patents, publications and referenced application are incorporated herein by reference.

Many variations of this invention will suggest themselves to those skilled in this art in light of the above, detailed description. For example, instead of wood fiber or sand, clay, sawdust, wood chips and wood particles can be used. The hydrolyzed pregelled yellow corn flour can have the pH adjusted with ammonia. Instead of an extruder, gelatinization can be accomplished by an expander. Hydrolysis of the corn flour can be carried out with HCl instead of $H_2SO_4$. Acid modification of the corn flour can be carried out at 150°–200° F. Instead of nitrogen-bonded methylol groups in the crosslinker, alkoxyalkyl, especially methoxymethyl groups (which evolve alcohol instead of water on reaction with polyols), can be substituted. Instead of water as a solvent, lower alcohols, such as, but not limited to, methanol or ethanol and n-butanol can be used, as well as dioxane, methylene chloride, dimethylformamide and others known in this art; water is preferred. Instead of Lewis acid salts other acids can be used, including Bronsted acids. All such obvious variations are within the full intended scope of the appended claims.

We claim:

1. A method of manufacturing a bonded particulate article comprising the steps of
   (i) admixing particulate material with a binder system, the binder system being formed by admixing a polyol comprising a hydrolyzed, gelatinized amylaceous material, a crosslinker for said polyol (ii) comprising the reaction product of gloxal, urea and formaldehyde, alone, or in further combination with ethylene glycol, a solvent, and an acid wherein said reaction is carried out at a pH of below about 7;
   (ii) forming the admixture into a shape; and
   (iii) curing to produce the bonded article.
2. A method as defined in claim 1 wherein step (ii) is carried out in a heated mold, and step (iii) is carried out by removing the article from the heated mold and allowing it to cool.
3. A method as defined in claim 1 wherein said crosslinker is a compound of the formula

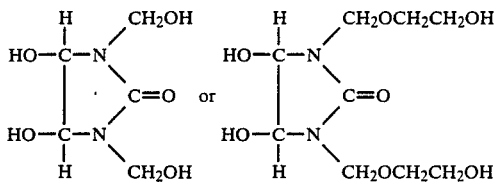

or a mixture of such compounds.

4. A method as defined in claim 1 wherein the solvent is water.
5. A method of manufacturing a bonded particulate article comprising the steps of
   (i) admixing sand with a binder system, the binder system being formed by admixing a polyol comprising a hydrolyzed, gelatinized amylaceous material, a crosslinker for said polyol (ii) comprising the reaction product of glyoxal, urea and formaldehyde, alone or in further combination with ethylene glycol, water, and an acid;
   (ii) forming the admixture into a shape; and
   (iii) curing to produce the bonded article.
6. A method of manufacturing a bonded particulate article comprising the steps of
   (i) admixing sand with a binder system wherein the latter is formed by admixing a hydrolyzed, gelatinized amylaceous saccharide-containing material with a crosslinker for said saccharide containing material comprising the reaction product of glyoxal, urea and formaldehyde, alone, or in combination with ethylene glycol, water, and an acid;
   (ii) forming the article in a mold; and
   (iii) desolventizing the article.
7. A method as defined in claim 6 wherein the desolventing is accomplished by the application of heat.
8. A method as defined in claim 6 wherein the application of heat is accomplished at least in part by use of microwave energy.
9. A method as defined in claim 6 wherein said crosslinker is a compound of the formula

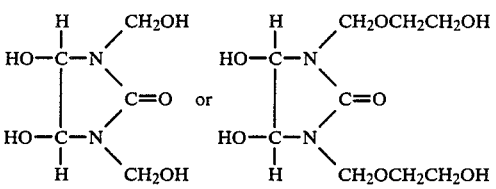

or a mixture of such compounds.

10. A bonded particulate article manufactured by the method of claim 6 comprising, before desolventizing, 80%–99% of particulate material and 1%–20% of binder system, with the latter being comprising of 20%–50% of hydrolyzed, gelatinized amylaceous material, 3%–60% of crosslinker, and 0.2%–10% of an acid, and 15–85% of solvent, by weight.
11. An article as defined in claim 10 wherein the article is a foundary core.
12. A method of manufacturing a formed article comprising:
    (a) dispersing fillers, extenders and pigments in a hydrolyzed, gelatinized amylaceous material in an amount up to 80% and adding water to the mixture;

(b) adding a mixture of a heterocyclic crosslinking compound of the formulae

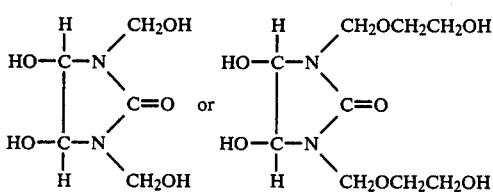

or a mixture of such compounds, and water wherein said compound or compounds are the reaction products of a reaction carried out at a pH of below about 7;

(c) controlling the rate of the crosslinking reaction between the hydrolyzed, gelatinized amylaceous material and said heterocyclic compound by the use of an acid;

(d) forming the mixture into a shape; and (e) causing the mixture to cure by the application of heat.

13. A method as defined in claim 12 wherein the mixture used in steps (a), (b) and (c) is within the limits of 15-85% water, 20-55% amylaceous material, 3-60% heterocyclic compound, 0.2-10% acid and 15-85% water.

14. A method of manufacturing a resinlike material suitable for formed articles with the binder produced by the following steps:

(a) crosslinking a hydrolyzed, gelatinized material with a heterocyclic compound of the formula

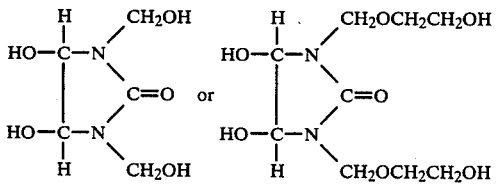

or a mixture of such compounds in water wherein said compound or compounds are the reaction products of a reaction carried out at a pH of below about 7;

(b) controlling the rate of the crosslinking reaction between the hydrolyzed gelatinized amylaceous material and said heterocyclic compound by the use of an acid salt; and said method including the following steps;

(c) dissolving or dispersing the acid, hydrolyzed, gelatizinzed amylacous material and said heterocyclic compound in water; and (d) causing the mixture to react by the application of heat.

15. A method as defined in claim 14 wherein prior to the application of heat up to 80% the weight of the binder system of fillers, pigments and extenders are dispersed in the binder system.

16. A method as defined in claim 14 wherein up to 80% of the weight of the binder system of fillers, pigments and extenders are pre-mixed with the hydrolyzed, gelatinized amylaceous material and steps (a) and (b) are carried out simultaneously.

17. A method of manufacturing a foundry core comprising mixing sand and heat-accelerated curable binder system wherein the binder system is produced by the following steps, the percentages being a percent of sand:

(a) crosslinking about 1-3% of a hydrolyzed, gelatinized amylaceous material with about 0.1-3% of a crosslinker comprising a heterocyclic compound of the formula

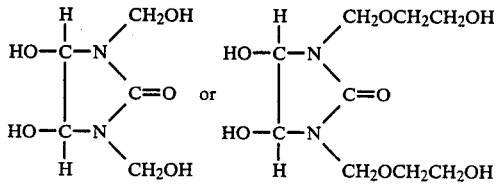

in about a 40 to 60% aqueous solution; and (b) controlling the rate of reaction by the use of 0.3-1.0% of an acid as a catalyst, said mixture also comprising 0-10% clay, 0-10% silica flour, 0-10% iron oxide, and an effective amount of a release agent selected from the group comprising wax, wax emulsion, asphalt emulsion, and wax-asphalt emulsion.

18. A method as defined in claim 17 including the step of curing the core for 5-180 seconds in a hot box at a temperature between 250°-550° F.

19. A method as defined in claim 18 followed by the step of postcuring the core by microwave energy.

20. A method as defined in claim 17 wherein the amylaceous material is the product of a process comprising the steps in the following sequence:

(a) hydrolyzing a material selected from corn flour, corn meal, corn grits, corn starch, sorghum flour, sorghum meal, sorghum grits, wheat flour, wheat starch, or a mixture of any of the foregoing at moistures between 5 and 12% by weight of the humidified material using between 0.1 and 2% by weight acid;

(b) adjusting the pH of the acid hydrolyzed amylaceous material to between 3 and 6 obtained on a 10% solids water slurry;

(c) gelatinizing the pH adjusted acid hydrolyzed amylaceous material at moisture levels between 15 and 40% and at temperatures of between 212° F. and 400° F.;

(d) removing water from the gelatinized product; and (e) comminuting the dried amylaceous mass to a flour.

21. A method as defined in claim 17 wherein the acid is selected from acetic acid, hydrochloric acid, sulfuric acid, a zinc salt, a magnesium salt, an aluminum salt or a mixture of any of the foregoing.

22. A method as defined in claim 21 wherein the acid is zinc nitrate.

23. A method as defined in claim 21 wherein the acid is magnesium nitrate.

24. A method as defined in claim 17 which includes the step of removing the core from the form and drying the core.

25. A method as defined in claim 24 wherein the drying is performed in an oven.

* * * * *

UNITED STATES PATENT AND TRADEMARK OFFICE
CERTIFICATE OF CORRECTION

PATENT NO. : 4,711,669
DATED : December 8, 1987
INVENTOR(S) : Albert P. Paul et al It is certified that error appears in the above—identified patent and that said Letters Patent is hereby corrected as shown below:

Cover Page - Left Column - Item [73] should read--

Assignees: American Cyanamid Company
Stamford, Connecticut; and

Krause Milling Company
Milwaukee, Wisconsin, part interest --.

Signed and Sealed this

Thirteenth Day of September, 1988

Attest:

DONALD J. QUIGG

Attesting Officer     Commissioner of Patents and Trademarks